United States Patent
Barrett et al.

(10) Patent No.: US 8,898,002 B2
(45) Date of Patent: Nov. 25, 2014

(54) GEOGRAPHICAL LOCATION AGGREGATION FROM MULTIPLE SOURCES

(71) Applicant: CloudCar, Inc., Los Altos, CA (US)

(72) Inventors: Peter Barrett, Palo Alto, CA (US); Zarko Draganic, Belvedere, CA (US)

(73) Assignee: CloudCar, Inc., Los Altos, CA (US)

( * ) Notice: Subject to any disclaimer, the term of this patent is extended or adjusted under 35 U.S.C. 154(b) by 8 days.

(21) Appl. No.: 13/686,894

(22) Filed: Nov. 27, 2012

(65) Prior Publication Data

US 2014/0149032 A1    May 29, 2014

(51) Int. Cl.
| | |
|---|---|
| G01C 21/26 | (2006.01) |
| G06F 17/00 | (2006.01) |
| G06F 19/00 | (2011.01) |
| G05D 1/02 | (2006.01) |

(52) U.S. Cl.
CPC .................................. G01C 21/26 (2013.01)
USPC ........... 701/408; 701/409; 701/430; 701/472; 701/483; 701/522; 340/995.12; 340/995.18

(58) Field of Classification Search
USPC ............... 701/36, 116, 29.1, 29.3, 29.6, 31.4, 701/31.5, 31.7, 31.9, 32.3, 32.4, 32.5, 32.7, 701/33.2, 33.4, 33.6, 33.7, 33.9, 33.8, 34.1, 701/34.2, 34.4, 400, 408, 409, 412, 418, 701/423, 425, 426, 430, 438, 439, 445, 446, 701/450, 451, 461, 462, 466, 467, 468, 469, 701/472, 483, 484, 485, 494, 495, 500, 501, 701/505, 510, 516, 522, 527, 537, 300; 340/988, 989, 993, 995.12, 995.1, 340/995.14, 995.17, 995.18, 995.28, 340/995.25; 455/426.1, 427, 452.2, 454, 455/456.1, 456.2, 456.3, 456.5, 456.6, 457
See application file for complete search history.

(56) References Cited

U.S. PATENT DOCUMENTS

| | | | | |
|---|---|---|---|---|
| 5,428,546 | A | * | 6/1995 | Shah et al. ..................... 701/454 |
| 5,541,845 | A | * | 7/1996 | Klein ............................. 701/446 |
| 5,594,650 | A | * | 1/1997 | Shah et al. ..................... 701/454 |
| 8,046,501 | B2 | | 10/2011 | Gormley |
| 2002/0038182 | A1 | * | 3/2002 | Wong et al. ................... 701/213 |

OTHER PUBLICATIONS

Georg zur Bonsen, Daniel Ammann, Michael Ammann, Etienne Favey, and Pascal Flammant, "Combining GPS with Sensor-Based Dead Reckoning", GPS World, Apr. 1, 2005.

* cited by examiner

*Primary Examiner* — Thomas Tarcza
*Assistant Examiner* — Edward Pipala
(74) *Attorney, Agent, or Firm* — Inventive Patent Law P.C.; Jim H. Salter

(57) ABSTRACT

Systems and methods for obtaining geographical location data from multiple sources and aggregating the geographical location data are disclosed. A particular embodiment includes: receiving geo-location data from a plurality of geo-location data collectors, at least one of the plurality of geo-location data collectors being in data communication with an in-vehicle geo-location data source, at least one of the plurality of geo-location data collectors being in data communication with a geo-location data source in a mobile device; collecting reliability data corresponding to one or more of a plurality of geo-location data sources corresponding to the plurality of geo-location data collectors; collecting map data including information related to geographical features associated with the geo-location data; and aggregating, by use of a data processor, the geo-location data from the plurality of geo-location data collectors based on the reliability data and the map data to produce a resulting geo-location fix.

16 Claims, 5 Drawing Sheets

```
                Geographical Location Data Aggregation System
                            Processing Logic
                                 -400-
                                   │
                                   ▼
   Receive geo-location data from a plurality of geo-location
   data collectors, at least one of the plurality of geo-location
      data collectors being in data communication with an in-
        vehicle geo-location data source, at least one of the
         plurality of geo-location data collectors being in data
         communication with a geo-location data source in a
                             mobile device.
                                 -410-
                                   │
                                   ▼
       Collect reliability data corresponding to one or more of a
        plurality of geo-location data sources corresponding to the
                plurality of geo-location data collectors.
                                 -420-
                                   │
                                   ▼
          Collect map data including information related to
       geographical features associated with the geo-location
                                data.
                                 -430-
                                   │
                                   ▼
      Aggregate the geo-location data from the plurality of geo-
       location data collectors based on the reliability data and
           the map data to produce a resulting geo-location fix.
                                 -440-
                                   │
                                   ▼
                                  End
```

Figure 4

GEOGRAPHICAL LOCATION AGGREGATION FROM MULTIPLE SOURCES

TECHNICAL FIELD

This patent document pertains generally to tools (systems, apparatuses, methodologies, computer program products, etc.) for processing geographical location data, and more particularly, but not by way of limitation, to a system and method for obtaining geographical location data from multiple sources and aggregating the geographical location data.

BACKGROUND

An increasing number of vehicles are being equipped with one or more independent computer and electronic processing systems. Certain of the processing systems are provided for vehicle operation or efficiency. For example, many vehicles are now equipped with computer systems for controlling engine parameters, brake systems, tire pressure and other vehicle operating characteristics. Other in-vehicle processing systems provide location-based services, such as navigation and proximity alerting. In support of these location-based services, many vehicles are being equipped with one or more global positioning system (GPS) devices. GPS devices use a well-known technology for receiving data and timing from satellites to determine a geographical location or geo-location. GPS receivers can provide location and time information in all weather, anywhere on or near the Earth, where there is an unobstructed line of sight to four or more GPS satellites. However, an unobstructed line of sight to four or more GPS satellites in a moving vehicle is not always practical. For example, tunnels, canyons, mountains, tall buildings, and the like can interfere with GPS signal reception. As a result, reliable geo-location data from in-vehicle GPS receivers can be intermittent, inaccurate, or lost altogether.

BRIEF DESCRIPTION OF THE DRAWINGS

The various embodiments is illustrated by way of example, and not by way of limitation, in the figures of the accompanying drawings in which:

FIG. 4 is a processing flow chart illustrating an example embodiment of systems and methods for providing a cloud-based vehicle information and control ecosystem.

DETAILED DESCRIPTION

Figure 1:
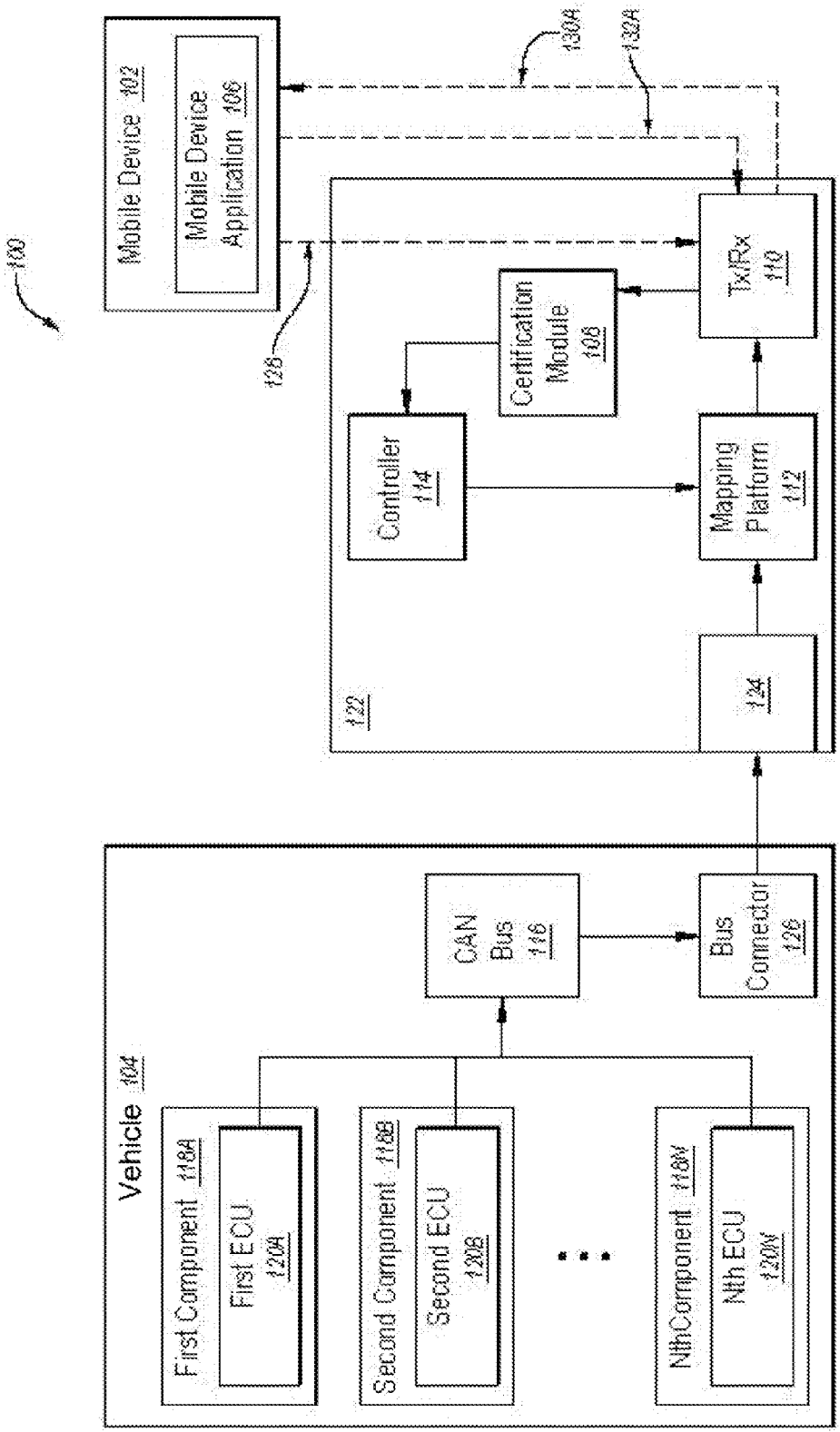
FIG. 1 illustrates a block diagram of an example vehicle data abstraction and communication system in which embodiments described herein may be implemented.

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for obtaining geographical location data from multiple sources and aggregating the geographical location data are described herein. In one particular embodiment, a geographical location aggregation system is provided in the context of a cloud-based vehicle information and control ecosystem configured and used like the ecosystem illustrated in FIG. 2. However, it will be apparent to those of ordinary skill in the art that the geographical location aggregation system described and claimed herein can be implemented, configured, and used in a variety of other applications and systems.

Particular example embodiments relate to the communication of signals and information and the activation of procedures and/or services between network resources, mobile devices, and Controller Area Network (CAN) buses in a vehicle. Embodiments disclosed herein generally can use the signals communicated between electronic control units (ECUs) of a vehicle, a controller platform, network-based mobile devices, such as mobile phones or mobile computing platforms, and network resources, such as server computers. Data signals communicated from the ECUs to the mobile devices or network resources may include information about the state of one or more of the components of the vehicle, including a geo-location fix or timing information from one or more GPS receivers installed in the vehicle. In particular, in some embodiments the data signals, which are communicated from the ECUs to the CAN bus, are abstracted by an automotive data abstraction and communication device (abstraction device). The abstraction device connects directly to an On Board Diagnostics (OBD) connector that enables access to the CAN bus. The abstraction device converts the data signals from a vehicle-specific format to a mobile device format defined by an Application Programming Interface (API). The abstraction device then wirelessly and securely transmits the data signals to the mobile device and/or a network resource. By converting the data signals to the mobile device format, the mobile device may use the data signals without knowing the vehicle-specific or GPS-specific format. Additionally, the mobile device format defined by the API exposes the data signals, ECUs and other vehicle hardware and software in a standardized way, thereby enabling multiple vendors or software developers to create mobile device applications that process the data signals. In the same way, the API can expose the data signals, ECUs and other vehicle hardware and software in a standardized way for the network resources.

Additionally, a user of the mobile device and/or a network resource can send a write or control signal from the mobile device and/or network resource through the abstraction device to the CAN bus. The write/control signal enables the user of the mobile device and/or network resource to alter the state of one or more components included in the vehicle. The write signal is formatted in the mobile device format defined by the API and wirelessly transmitted to the abstraction device. The abstraction device converts the write/control signal to the vehicle-specific format and communicates the write signal to the vehicle. By converting the write signal from the mobile device format defined by the API to the vehicle-specific format or GPS receiver-specific format, the abstraction device may interface with multiple vehicles. Additionally, the mobile device format defined by the API acts as a common programming language enabling multiple vendors to write mobile device and/or network resource applications that may communicate read and write signals to multiple types of vehicles independent of the model or manufacturer. In this manner, a mobile device, a network resource, or other vehicle subsystems can have access to geo-location data generated by an in-vehicle GPS receiver, by an in-vehicle dead reckoning subsystem, by a mobile device geo-location subsystem, or by a network resource geo-location subsystem. In the various example embodiments described in more detail below, the geo-location data generated by a variety of sources can be shared with a variety of other subsystems in the cloud-based vehicle information and control ecosystem. As a result, a more accurate geo-location can be determined based on an aggregate of the geo-location information obtained from a plurality of sources.

As used herein, the term "CAN bus," refers to any bus used in a vehicle for communicating signals between ECUs or components, including automotive standards or other standards like MOST, LIN, I2C and Ethernet. The CAN bus may be a bus that operates according to versions of the CAN specification, but is not limited thereto. The term "CAN bus" can therefore refer to buses that operate according to other specifications, including those that might be developed in the future.

As used herein and unless specified otherwise, the term "mobile device" extends to any device that can communicate with the abstraction devices described herein to obtain read or write access to messages or data signals communicated on a CAN bus or via any other mode of inter-process data communications. In many cases, the mobile device is a handheld, portable device, such as a smart phone, mobile phone, cellular telephone, tablet computer, laptop computer, display pager, radio frequency (RF) device, infrared (IR) device, global positioning system (GPS) device, Personal Digital Assistants (PDAs), handheld computers, wearable computer, portable game console, other mobile communication and/or computing device, or an integrated device combining one or more of the preceding devices, and the like. Additionally, the mobile device can be a computing device, personal computer (PC), multiprocessor system, microprocessor-based or programmable consumer electronic device, network PC, diagnostics equipment, a system operated by a vehicle manufacturer or service technician, and the like, and is not limited to portable devices. The mobile device can receive and process data in any of a variety of data formats. The data format may include or be configured to operate with any programming format, protocol, operating system, or language including, but not limited to, JavaScript, C++, iOS, Android, etc.

As used herein and unless specified otherwise, the term "network resource" extends to any device, system, or service that can communicate with the abstraction devices described herein to obtain read or write access to messages or data signals communicated on a CAN bus or via any other mode of inter-process or networked data communications. In many cases, the network resource is a data network accessible computing platform, including client or server computers, websites, mobile devices, peer-to-peer (P2P) network nodes, and the like. Additionally, the network resource can be a web appliance, a network router, switch, bridge, gateway, diagnostics equipment, a system operated by a vehicle manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resource may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The data network (also denoted the network cloud) used with the network resources can be configured to couple one computing or communication device with another computing or communication device. The network may be enabled to employ any form of computer readable data or media for communicating information from one electronic device to another. The network can include the Internet in addition to other wide area networks (WANs), metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (IS-DNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly.

The network may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G and future access networks may enable wide area coverage for mobile devices, such as one or more of client devices, with various degrees of mobility. For example, the network may enable a radio connection through a radio network access, such as Global System for Mobile communication (GSM), General Packet Radio Services (GPRS). Enhanced Data GSM Environment (EDGE). Wideband Code Division Multiple Access (WCDMA), CDMA2000, and the like. The network may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, the network may include virtually any wired and/or wireless communication mechanisms by which information may travel between one computing device and another computing device, network, and the like.

In a particular embodiment, a platform system and/or a mobile device with network access may act as a client device enabling a user to access and use the cloud-based vehicle information and control system via the network. These client devices may include virtually any computing device that is configured to send and receive information over a network, such as network ecosystem as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible lITML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging. Over the Air (OTA) messaging, or the like, between another computing device, and the like. The client devices may also include a wireless application device on which a client application is configured to enable a user of the device to send and receive information to/from network resources wirelessly via the network.

FIG. 1 illustrates a block diagram of an example vehicle data abstraction and communication system 100 in which components of the embodiments described herein may be implemented. FIG. 1 depicts an example of an operating environment for the vehicle data abstraction and communication systems described herein. FIG. 1 also illustrates an example embodiment in which a mobile device 102 is identified as having an authentication level that permits the mobile device 102 to have access to higher-level events mapped from CAN messages, as opposed to being given direct access to raw CAN messages.

In FIG. 1, the system 100 includes a vehicle 104, an abstraction device 122, and a mobile device 102. Generally, FIG. 1 depicts the communication of data signals from the vehicle 104 to the abstraction device 122 and to the mobile device 102. Some of the data signals can be produced at the vehicle 104, the format of the data signals are converted at the abstraction device 122, and the data signals are processed at the mobile device 102.

FIG. 1 depicts a system 100 that includes the vehicle 104. The systems and methods described herein can be used with substantially any mechanized system that uses a CAN bus as defined herein, including, but not limited to, industrial equipment, boats, trucks, or automobiles; thus, the term "vehicle" extends to any such mechanized systems. The systems and methods described herein can also be adapted for use with other devices that have accessible data, such as medical equipment. The systems and methods described herein can also be used with any systems employing some form of network data communications.

In a particular embodiment related to a cloud-based vehicle information and control ecosystem, vehicle 104 may include multiple automotive components 118A-118N (generally, a component 118 or components 118). The components 118 include the individual apparatuses, systems, subsystems, mechanisms, etc. that are included in the vehicle 104. The components 118 may include, but are not limited to windows, door locks, oxygen sensors, an ignition system, windshield wipers, brakes, engines, GPS and navigation systems, a tachometer, etc.

The vehicle 104 may additionally include one or more electronic control units 120A-120N (an ECU 120 or ECUs 120). The ECUs 120 are associated with the components 118. As used with respect to the relationship between the ECUs 120 and the components 118, the term "associated with" may refer to the component 118 including an ECU 120, the component 118 being coupled to and ECU 120 for monitoring a state of the component 118, the ECU 120 controlling the component 118, or some combination thereof. As illustrated in FIG. 1, one ECU 120 is associated with one component 118. However, this depiction is not meant to be limiting. In some embodiments, one ECU 120 may be associated with multiple components 118. Additionally or alternatively, multiple ECUs 120 may be associated with a single component 118. Additionally or alternatively, some embodiments include ECUs 120 associated with some subset of ECUs 120, etc.

In FIG. 1, a first component 118A is associated with a first ECU 120A, a second component 118B is associated with a second ECU 1203, and an Nth component 118N is associated with an Nth ECU 120N. The inclusion of the Nth component 118N, the Nth ECU 120N, and the ellipses is meant to indicate that the number of components 118 and/or ECUs 120 are not limited. That is, the vehicle 104 may include hundreds or thousands of components 118 and/or ECUs 120, for instance.

In the particular embodiment shown in FIG. 1, the first ECU 120A associated with the first component 118 may monitor the first component 118. The ECU 120A may communicate a state or a condition of the first component as a data signal to the CAN bus 116. For example, if the first component 118A was the steering wheel, the first ECU 120A may communicate the radial position of the steering wheel in real time to the CAN bus 116. For another example, if the first component 118A was an in-vehicle GPS device, the first ECU 120A may communicate the geo-location of the vehicle in real time to the CAN bus 116. Similarly, the second ECU 120B and the Nth ECU 120N may communicate the data signals to the CAN bus 116 regarding the state or the condition of the second component 118B and the Nth component 120N, respectively. Accordingly, the data signals may include, but are not limited to, the geo-location of the vehicle based on data reported from a GPS device, the speed of the vehicle, the distance traveled by the vehicle since engine start, positions of the vehicle windows, positions of the vehicle door locks, oxygen levels measured in the oxygen sensors, ignition timing, state of the windshield wipers, a position of the steering wheel, RPM of the engine, and the like.

The data signals may be formatted in a vehicle-specific format—i.e., specific to a vehicle make and model. The vehicle-specific format generally refers to the format of the data signals for the vehicle 104. That is, the vehicle 104 may be manufactured by a first manufacturer that may have a vehicle-specific format for all its vehicles. Alternatively, the first manufacturer may have a vehicle-specific format for different models, years, option packages, etc. Generally, the vehicle-specific formats of different vehicles 104 are not the same. Thus, a vehicle manufactured by the first manufacturer typically has a different vehicle-specific format that a second vehicle manufactured by a second manufacture. Additionally or alternatively, in some embodiments, the data signals may be differential signals.

The CAN bus 116 receives the data signals from the ECUs 120. Additionally, the CAN bus 116 may enable the components 118 or some subset thereof to internally communicate without an additional computer system. Thus, data signals received at the CAN bus 116 may be available for download, may be internally communicated within the vehicle 104, or may be dropped.

In some embodiments, the CAN bus 116 may be coupled to a bus connector 126 that enables access to the CAN bus 116. For example, in this and other embodiments, the vehicle 104 may include an On Board Diagnostics (OBD) connector. The bus connector may be configured according to an OBD II specification, for instance. In embodiments with multiple CAN buses 116, the vehicle 104 may include multiple bus connectors 126 and/or alternative bus connectors that enable access to one or more CAN buses 116. In most modern vehicles, the CAN bus 116 includes the bus connector 126 located under the hood or accessible through the removal of a panel in the cabin of the vehicle 104. However, embodiments described herein can be implemented by using connector 124 that connects with CAN bus 116 in any available way.

The data signals or some subset thereof may be communicated to the abstraction device 122. In some embodiments, the abstraction device 122 is a discrete unit that can be adapted for use with one or more existing or new vehicles 104. For example, as explained herein, the abstraction device 122 can be embodied in a discrete unit that can be installed in an existing or new vehicle 104 by connecting it to the bus connector 126 (e.g., an OBD II connector) associated with CAN bus 116. In this way, the methods and systems described herein can be easily used with substantially any new or existing vehicle 104 that includes a CAN bus 116.

In other embodiments, the abstraction device 122 or elements thereof may be integrated into new vehicles or retrofitted into an existing vehicle. Under this approach, the elements of the abstraction device 122 are a substantially permanent system of vehicle 104. In this case, abstraction device 122 can replace or supplement the bus connector 126 that may otherwise be present in the vehicle 104. In these embodiments, the abstraction device 122 may be a platform within a larger apparatus or system or may be an integrated circuit with controllers and/or microcontrollers that manage or dictate the function of the abstraction device 122.

The abstraction device 122 couples with the bus connector 126 associated with the CAN bus 116 via a connector 124. For example, the CAN bus 116 may have a bus connector 126 (e.g., an OBD II connector) that is adapted to connect with the connector 124 or the abstraction device 122 may include the connector adapted to interface with the bus connector 126. Generally, the interface between the connector 124 and the bus connector 126 includes a physical connection as well as an electrical interface such that the data signals communicated to the CAN bus 116 may be further communicated to the abstraction device 122.

When connected to the CAN bus 116, the connector 124 may communicate the data signals to mapping platform 112. Generally, the mapping platform 112 may be configured to convert a data signal from the vehicle-specific format into a mobile device format and/or a network resource format defined by an Application Programming Interface (API). Additionally, in some embodiments, the API included in the mapping platform 112 may enable the conversion of data signals from multiple vehicle-specific formats to the mobile device format and/or a network resource format. Thus, the mapping platform 112 may not be specific to the vehicle 104. Some additional details of the mapping platform 112 and the API are discussed with reference to FIG. 3.

Alternatively, in some embodiments, the abstraction device 122 may include one or more controllers 114 that may be configured to receive one or more data signals from the CAN bus 116. The controller 114 may then communicate the data signals to the mapping platform 112.

In the example embodiment of FIG. 1, the abstraction device 122 may include a certification module 108 configured to limit access to the data signal converted to the mobile device format by the mapping platform 112. In the example of FIG. 1, the certification module 108 determines that mobile device 102 is authenticated at a level that permits the mobile device 102 to access events mapped from the CAN messages by the mapping platform 112. In this way, mobile device 102, in this example, is prevented from having full access to the raw CAN messages, thereby substantially limiting the ability of mobile device 102 to perform action that might damage the vehicle 104 or put the passengers in danger.

As shown in FIG. 1, the transceiver 110 ("Tx/Rx" in FIG. 1) may receive an identification signal from the mobile device 102 and/or a mobile device application 106 on the mobile device 102. The communication of the identification signal is indicated by the arrow 128 in FIG. 1. The identification signal 128 may include one or more privileges possessed by the mobile device 102 and/or the mobile device application 106. For example, the mobile device 102 may be owned or operated by a mechanic who may have a specific privilege without authentication of the specific mobile device application 106 or the specific mobile device application 106 may include a privilege. Some examples of privileges may include one or more read privileges and/or one or more write privileges. The identification signal 128 may be communicated from the transceiver 110 to the certification module 108. The certification module 108 may verify or authenticate whether the mobile device 102 and/or the mobile device application 106 includes a specific privilege.

Abstraction device 122 can be implemented using systems that enhance the security of the execution environment, thereby improving security and reducing the possibility that the abstraction device 122 and the related services could be compromised by viruses or malware. For example, abstraction device 122 can be implemented using a Trusted Execution Environment, which can ensure that sensitive data is stored, processed, and communicated in a secure way.

As stated above, the transceiver 110 may receive data signals that have been converted to the mobile device format and/or a network resource format defined by the API. The transceiver 110 may then communicate the data signals formatted in the mobile device format to the mobile device 102.

In FIG. 1, the communication of the data signal to the mobile device 102 is represented by arrow 130A. More specifically, in this and other embodiments, the transceiver 110 may be configured to wirelessly communicate the data signal in the mobile device format to the mobile device 102. The transceiver 110 may include several configurations. In this and other embodiments, the transceiver 110 may include: a wireless receiver to receive identification signals and/or write signals from the mobile device 102; another receiver to receive the data signals from the mapping platform 112; a wireless transmitter to communicate the data signals in the API to the mobile device 102; and another transmitter that communicates identification signals to the communication module 108 and/or write signals to the mapping platform 112. In some embodiments, the transceiver 110 includes a Bluetooth transceiver.

Additionally in some embodiments, the transceiver 110 may establish a secure channel between the abstraction device 122 and the mobile device 102. In addition to or alternative to the secure channel, the abstraction device 122 may encrypt the data signals formatted in the mobile device format. The mobile device 102 may decrypt the data signals. The inclusion of the secure channel and/or encryption may enhance security of the data signals communicated to the mobile device 102.

The mobile device 102 receives the data signals communicated from the abstraction device 122. In embodiments in which the transceiver 110 wirelessly communicates the data signals to the mobile device 102, the mobile device 102 can include wireless capabilities such as Bluetooth, Wi-Fi, 3G, 4G, LTE, etc. For example, if the transceiver 110 includes a Bluetooth transceiver, the mobile device 102 includes Bluetooth capabilities. Generally, the mobile device 102 includes one or more mobile device applications 106 that process the data signals. The mobile device application 106 may be loaded, downloaded, or installed on the mobile device 102. Alternatively, the mobile device 102 may access the mobile device application 106 via a network cloud or internet browser, for example. The mobile device application 106 may also be accessed and used as a Software as a Service (SaaS) application. The mobile device application 106 may be written or created to process data signals in the mobile device format rather than the vehicle-specific format. Accordingly, the mobile device application 106 may be vehicle-agnostic. That is, the mobile device application 106 may process data signals from any vehicle 104 once the data signals formatted in the vehicle-specific format are converted by the mapping platform 112.

In some embodiments, the mobile device application 106 includes an ability to perform an API call. The API call is represented in FIG. 1 by arrow 132A. The API call 132A may be an integrated portion of the mobile device application 106 and may allow a user of the mobile device 102 to request data signals from the vehicle 104. The API call 132A may be communicated to the transceiver 110, which then relays the content of the API call 132A through the mapping platform 112, which converts the requested data signals to the mobile device format. The requested data signals are transmitted to the mobile device 102. In other embodiments, a remote procedure call (RPC) can be used to request data or invoke a function using an inter-process communication that allows a mobile device application 106, for example, to cause a subprocess or procedure to execute in a vehicle component 118 or the abstraction device 122.

By processing the data signals, the mobile device application 106 may function better than a mobile device application without the data signals or may be able to provide functionality not possible without the data signals. For example, the mobile device applications 106 may include a navigation application. The navigation application may receive GPS signals as well as data signals related to a radial position of the steering wheel, an angle of the tires, a speed, etc. of the vehicle 104. The navigation application may process the GPS signals as well as the data signals from the vehicle 104. Thus, the navigation application may output more accurate navigation data than another navigation application that only processes GPS signals.

Additionally or alternatively, the mobile device application 106 may enable abstraction of data signals for aggregate uses. For some aggregate uses, the mobile device application 106 may sync with one or more secondary systems (not shown). For example, the mobile device 102 may abstract data signals related to states of the windshield wipers. The mobile device 102 may communicate with a secondary system that determines weather patterns based on the state of windshield wipers in multiple vehicles in a given location at a given time.

Examples of the mobile device applications 106 are not limited to the above examples. The mobile device application 106 may include any application that processes, abstracts, or evaluates data signals from the vehicle 104 or transmits write/control signals to the vehicle 104.

Figure 2:
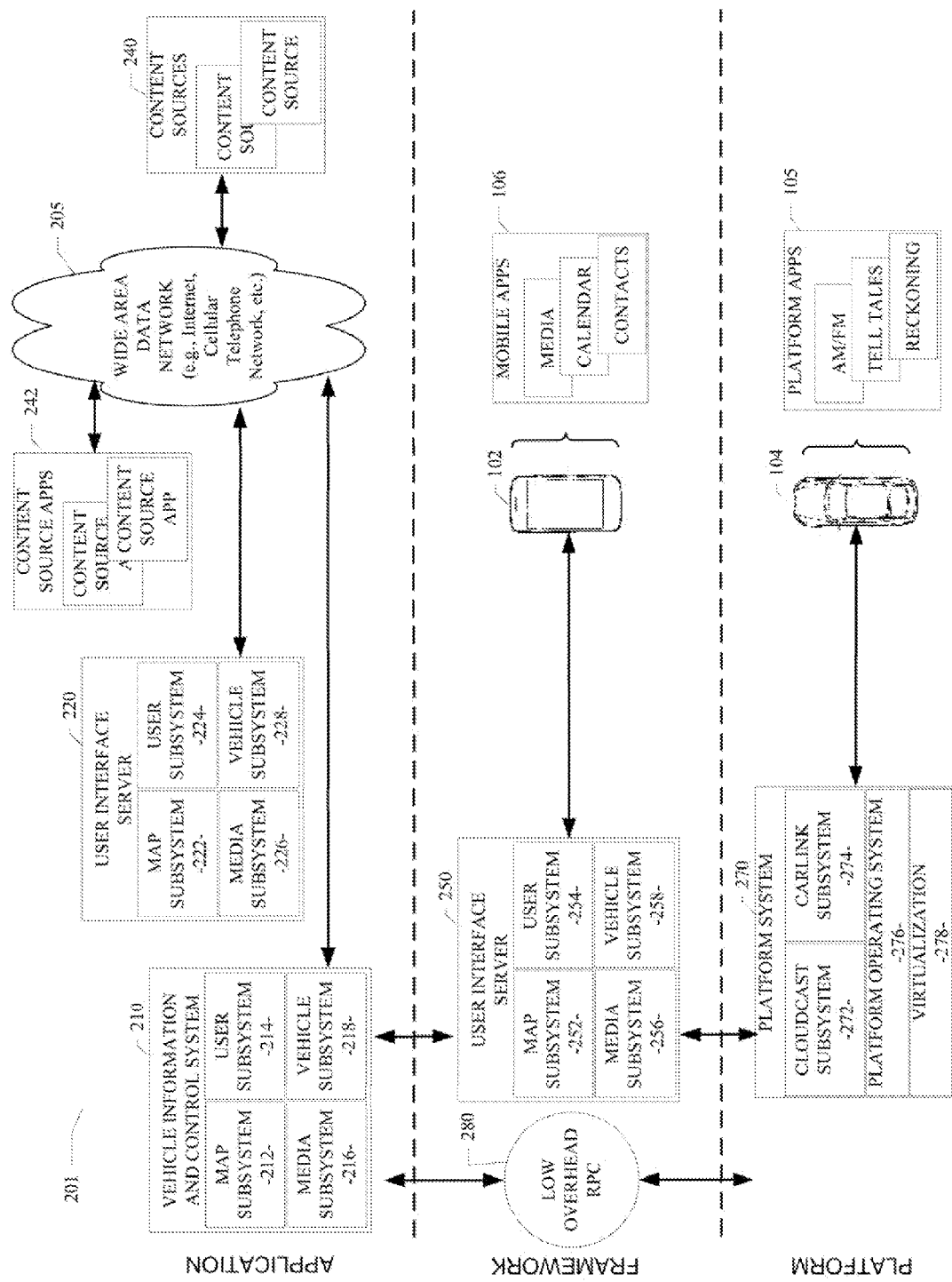
FIG. 2 illustrates an example embodiment of a cloud-based vehicle information and control ecosystem.

Referring now to FIG. 2, a cloud-based vehicle information and control ecosystem 201 is illustrated. In an example embodiment, the communication path between a mobile device and the subsystems of a vehicle as described above can be expanded into a cloud-based vehicle information and control ecosystem that brings the full power of the Web to bear on enhancing the driving experience. In the particular example embodiment shown in FIG. 2, the ecosystem 201 can be partitioned into three layers: an application layer (first layer), a framework layer (second layer), and a platform layer (third layer). The application layer represents the most abstract and broad level of the vehicle information and control system. The application layer can include a vehicle information and control system 210, which can provide several subsystems including a map or geo-location-based support subsystem 212, a user or people/communication-based support subsystem 214, a media (e.g. audio or video) support subsystem 216, and a vehicle subsystem 218. These subsystems provide support for a variety of vehicle, driver, passenger, and $3^{rd}$ party applications, such as geo-navigation, in-vehicle control of media, hands-free communication, monitoring and control of various vehicle systems and components, convergence of social communities with vehicle operation, mining of vehicle and/or driving related data from a single vehicle or thousands of vehicles. The application layer can be in data communication with content sources 240 via the network cloud 205 directly or via one or more apps (software application modules) 242 configured to process and serve data and services from a particular content source 240. The network cloud 205 represents one or more of the various types of data networks described above, such as the Internet, cellular telephone networks, or other conventional data networks and related network protocols. The content sources 240 represent a type of the network resources (e.g., server computers, websites, etc.) described above. In an example embodiment, the application layer is configured to provide information access and control to users from a variety of user devices via local or remote data communications.

Additionally, the application layer can provide a user interface server 220 to support human interaction with the various applications of the application layer. In a particular embodiment, the user interface server 220 can include: a map or geo-location-based support subsystem interface 222, a user or people/communication-based support subsystem interface 224, a media (e.g., audio or video) support subsystem interface 226, and a vehicle subsystem interface 228. The user interface server 220 can be in data communication with the vehicle information and control system 210 via the network cloud 205. The user interface server 220 can also be in data communication with content sources 240 via the network cloud 205.

In an example embodiment, the map or geo-location-based support subsystem 212 and its related interface 222 provides information and services to support in-vehicle navigation, mapping, routing, location searching, proximity alerting, and a variety of functions related to geo-location. One of the components 118 of the vehicle 104 can include a global positioning system (GPS) device that can produce a geo-coordinate position of the vehicle 104 at any point in time. Alternatively or in addition, a GPS device can be available in a mobile device that is accessible to one of the components 118 of the vehicle 104. The data from these one or more GPS devices is accessible to the geo-location-based support subsystem 212 using the data transfer mechanisms described above. The geo-location-based support subsystem 212 can use this geo-coordinate position of the vehicle 104 to correlate the locations of points of interest in proximity to the location of the vehicle. The locations of these points of interest can be obtained from a locally maintained database or from any of the network resources accessible via the network cloud 205. The geo-location-based support subsystem interface 222 can present these points of interest to an occupant of the vehicle 104 using the data transfer mechanisms described above. The occupant of the vehicle can select one or more points of interest and the geo-location-based support subsystem 212 can generate mapping, navigation, and routing information related to the selected points of interest. The geo-location-based support subsystem interface 222 can also generate alerts to notify the vehicle occupant of the proximity of a point of interest.

In an example embodiment, the user or people/communication-based support subsystem 214 and its related interface 224 provides information and services to support interactions and communications between people. These interactions and communications can include in-vehicle wireless telephone communications, messaging, texting, social network updates (e.g., Facebook, Twitter, etc.), contact list management, conferencing, and the like. The user or people/communication-based support subsystem 214 can also coordinate with the geo-location-based support subsystem 212 to correlate the geo-locations of people of interest and generate corresponding alerts. The people of interest can be determined or user-specified based on contact lists, social network profiles, network resource searches, and the like.

In an example embodiment, the media (e.g., audio or video) support subsystem 216 and its related interface 226 provides information and services to support the search, selection, purchase, and playing of audio, video, or other media selections in the vehicle. One of the components 118 of the vehicle 104 can include a media player, which can receive content for playback from a traditional antennae source, an optical disc source (e.g., compact disc—CD), magnetic tape, or the like. Additionally, the media player can include a dock or physical interface for receiving a portable MP3 player, cellular telephone, or other mobile device. The media player can be configured to play or record media content from these mobile devices. Moreover, the media player can include an interface for search, selection, purchase, and playing of audio, video, or other media selections from a network resource. In this manner, any media content available in the network cloud 205 can be streamed or downloaded to a media player and played or recorded in the vehicle.

In an example embodiment, the vehicle subsystem 218 and its related interface 228 provides information and services to support the monitoring, configuration, and control of vehicle subsystems. As described above, the components 118 of the vehicle 104 can include a variety of vehicle subsystems and related ECUs. The status of these vehicle subsystems can be communicated through the abstraction layers shown in FIG. 2 as described above. The vehicle subsystem 218 can receive these vehicle subsystem status signals and process these signals in a variety of ways. Similarly, vehicle control signals generated by the vehicle subsystem 218 and its related interface 228 can be communicated through the abstraction layers shown in FIG. 2 as described above. These control signals can be used by one or more components 118 of the vehicle 104 to configure and control the operation of the one or more components 118.

Referring still to FIG. 2, the framework layer represents a set of interfaces and control subsystems supporting the application layer and platform layer to which the framework layer is connected. The framework layer provides a lower level of abstraction for servicing a particular type of device, such as a mobile device 102 and the mobile apps 160 therein. The framework layer can provide a user interface server 250 to support human interaction with the various applications of the application layer via a map or location-based support subsystem interface 252, a user or people/communication-based support subsystem interface 254, a media support subsystem interface 256, and a vehicle subsystem interface 258. In one embodiment, the user interface server 250 at the framework layer can substantially mirror the functionality provided by the user interface server 220 at the application layer, except the user interface server 250 can be implemented in a smaller footprint (e.g., requires less memory and less processing power). As a result, the user interface server 250 may have less robust functionality or a reduced level of functionality with respect to subsystems of the user interface server 250 and corresponding subsystems of user interface server 220. However, the user interface server 250 can still provide support (albeit a reduced level of functionality) for vehicle and/or driver applications even when connection with the network cloud 205 is interrupted, intermittent, or temporarily lost. Thus, the framework layer is well-suited, though not exclusively suited, to a mobile environment where uninterrupted access to the network cloud 205 cannot always be assured. When access to the network cloud 205 is available, the full support of the vehicle and/or driver applications can be provided by the components of the application layer. When access to the network cloud 205 is not available or not reliable, a somewhat reduced level of support of the vehicle and/or driver applications can still be provided by the components of the framework layer without network cloud 205 connectivity. As shown in FIG. 2, the user interface server 250 can provide a user interface for the mobile apps executing on a mobile device 102. Because the user interface server 250 is in data communications with the components 118 of the vehicle 104 via the platform system 270 (described below), the user interface server 250 can provide any data or vehicle status signals needed by a mobile device app 106. Similarly, the user interface server 250 can communicate any control signals or configuration parameters from the mobile device app 106 to a corresponding component 118 via the platform system 270.

The platform layer represents a variety of components designed to reside on or with a platform system 270, which is typically installed on or in a vehicle, such as the vehicle 104 described above. As shown in FIG. 2, the platform system 270, of an example embodiment, can include a cloudcast subsystem 272, a carlink subsystem 274, a platform operating system 276, and a virtualization module 278. The platform operating system 276 can provide an execution environment for the platform system 270 components and interfaces to low-level hardware. The platform operating system 276 can execute platform apps 105 to process platform system 270 data and/or data captured from the ECUs of the vehicle. The virtualization module 278 can provide a logical abstraction or virtualization of the resources (hardware or software functional components) installed with or accessible to the platform system 270. The cloudcast subsystem 272 provides a variety of technologies and/or interfaces with which the platform system 270 can, for example, decode data and/or a media stream for presentation to vehicle occupants. In a particular embodiment, the platform system 270 can be implemented as the abstraction device 122 shown in FIG. 1 and described above.

Geo-Location Data Collection and Aggregation

Conventional technologies provide a process for mixing the signals produced by a GPS receiver and signals produced by dead reckoning subsystems. Dead reckoning subsystems refer to vehicle subsystems, such as speed sensors, distance measuring systems, gyroscopes, inertial navigation systems, and the like. For example, an article by Georg zur Bonsen, Daniel Ammann, Michael Ammann, Etienne Favey, and Pascal Flammant, titled, "Combining GPS with Sensor-Based Dead Reckoning", GPS World, Apr. 1, 2005 describes computing a weighted mix of GPS data and dead reckoning data. The algorithmic approach can be embedded into an enhanced Kalman filter. This approach eliminates multipath effects, position jumps, and distortions from jamming sources. Depending on the quality of the GPS signal (indicated, for example, by the number and distribution of visible satellites, dilution-of-precision value, etc.) and on the confidence level of the dead reckoning signal (that is, how well the sensors are calibrated at the moment), a weighted mix of both GPS and dead reckoning can be chosen to generate better results. In practice, this approach can provide uninterrupted, reliable navigation results in the most challenging urban environments including New York, Hong Kong, and Tokyo. However, for accurate dead reckoning, calibration is required for the odometer pulses and the gyroscope. Different vehicle models provide signals with different wheel pulses per unit distance. The dead reckoning software must match the wheel pulses with the distance traveled as measured with some reference, such as GPS. Calibration must be an ongoing process to account for small variations, such as those due to changing tires. In regard to the gyroscope, two parameters need to be calibrated: voltage offset and volts per degrees per second. Furthermore, the gyroscope exhibits temperature-dependent characteristics and aging effects. The on-going calibration process during normal operation must compensate for the aging effects. Thus, for a number of reasons, dead reckoning can be subject to inaccuracies. Even when signals produced by a GPS receiver and signals produced by dead reckoning subsystems are mixed, the errors persist, particularly when the GPS data becomes intermittent, interrupted, or unreliable.

The various embodiments described herein provide a system and method for obtaining geographical location data from multiple sources and aggregating the geographical location data to produce a more accurate geo-location fix. As described above, the geo-location data from one or more in-vehicle device subsystems can be obtained by one or more corresponding ECU(s) and communicated up the layers of the cloud-based vehicle information and control ecosystem 201. These in-vehicle device subsystems can include GPS receivers, dead reckoning subsystems, and other subsystems from which geo-location data can be extracted.

Furthermore, as described in more detail below, the layers of the cloud-based vehicle information and control ecosystem 201 can also provide access to GPS receivers, other geo-location sensing devices, or other geo-location data sources that may be available in the mobile devices of the occupants of the vehicle or available from network-based geo-location data sources. As described above and shown in FIG. 2, the framework layer, and the user interface server 250 therein, provides wireless access to a mobile device 102, which can include a GPS receiver from which GPS data can be extracted. Clearly, the GPS data obtained from the mobile device 102 is generated by a different GPS receiver than the GPS data obtained from an in-vehicle GPS receiver via a corresponding ECU. Moreover, and separate from the mobile device resident GPS receiver, mobile devices can be used for determining geo-location using other techniques. For example, cell tower triangulation can be used to determine the location of a cellular telephone merely based on the location of the cell towers that are receiving a wireless signal from the cellular telephone at any point in time. Similarly, many modern mobile devices are enabled for WiFi wireless network access. These mobile devices emit WiFi signals, which can be received and processed by a wireless router or other WiFi access point (WAP), if the router or WAP is within the range of the mobile device's WiFi signals. The router or WAP can be used by the WiFi-enabled mobile device to connect to a wide area network, such as the Internet. The location of the router or WAP can also be used to determine the geo-location of the mobile device, if the mobile device is within range of the router or WAP. Techniques for determining the location of a mobile device based on a mobile device resident GPS receiver, cell tower triangulation, or WiFi WAP proximity are well-known to those of ordinary skill in the art. As shown in FIG. 2, the framework layer, and the user interface server 250 therein, provides wireless access to a mobile device 102 and can use these various techniques for determining the location of a mobile device 102. As described in more detail herein, the location of a mobile device 102 can be shared with other layers and other subsystems for comparing and cross-checking location information obtained from other sources.

The application layer of the cloud-based vehicle information and control ecosystem 201, the vehicle information and control system 210, and user interface server 220 provide access to a variety of content sources 240 via network 205, which can represent network-based geo-location data sources. The network 205 can include the Internet. These network-based geo-location sources can provide a variety of geo-location data and reliability data, which can be used to reference or calibrate the geo-location fix received from a different source, particularly a source in a vehicle. For example, network-based geo-location sources, such as servers, websites, network nodes, and the like, can provide map data. The map data can be used to locate checkpoints at known geo-location fixes. These checkpoints and their corresponding geo-location fixes can be used to compare with the GPS data produced by a GPS receiver positioned at the checkpoint. Additionally, other checkpoints or locations with a known geo-location can be used as geo-location reference points. For example, a gas station, a city landmark, or a WiFi hotspot with a known geo-location can be used as a reference checkpoint. Thus, in an example embodiment, a variety of sources of geo-location data can be accessed and used in the various layers of the cloud-based vehicle information and control ecosystem 201.

Figure 3:
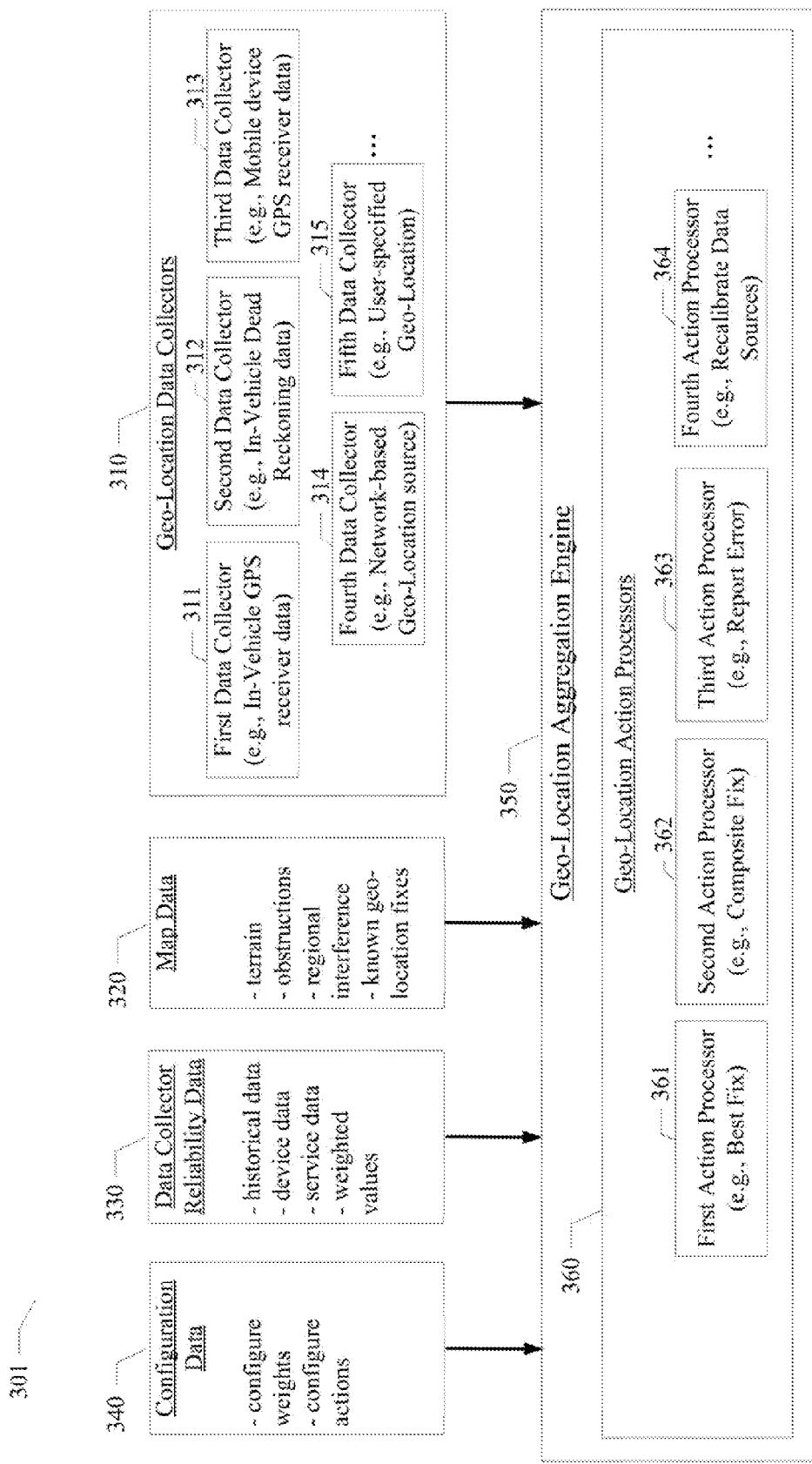
FIG. 3 illustrates the geo-location aggregation engine of an example embodiment.

Referring now to FIG. 3, the diagram illustrates the geo-location aggregation engine 350 of an example embodiment. The geo-location aggregation engine 350 receives input from a plurality of geo-location data collectors 310. The geo-location data collectors 310 are configured to collect geo-location data from a variety of geo-location data sources in the various layers of the cloud-based vehicle information and control ecosystem 201. For example, a first data collector 311 is configured to obtain geo-location data from one or more UPS receivers installed in a vehicle. Using the platform layer and the platform system 270 described above, the first data collector 311 can access an ECU 120 corresponding to the in-vehicle UPS receiver via the CAN bus 116 and retrieve GPS and timing data generated therein. The first data collector 311 can be configured to periodically retrieve the in-vehicle GPS data and process and/or store the retrieved data. The first data collector 311, and each of data collectors 310, can be implemented as a software or firmware module with processing logic embedded therein for performing the retrieval of the GPS and timing data (or other geo-location data or reliability data) from one or more GPS receivers or other geo-location devices installed in a vehicle.

Referring again to FIG. 2 and FIG. 3, the geo-location data collectors 310 can be implemented at any layer of the cloud-based vehicle information and control ecosystem 201. For example, the first data collector 311 can be implemented as an integrated component of platform system 270 or as part of an in-vehicle platform application 105 to collect GPS data from an in-vehicle GPS receiver. The first data collector 311 can also collect reliability data from the in-vehicle GPS receiver. Reliability data refers to data indicative of the reliability of the GPS data, such as signal strength, error counts, type of GPS receiver, and the like. The collected GPS data and reliability data can be provided or made available to any other component or subsystem at the platform layer. A second data collector 312 can be implemented as an integrated component of platform system 270 or as part of an in-vehicle platform application 105 to collect dead reckoning data and related reliability data from in-vehicle sensors and/or in-vehicle dead reckoning data subsystems. The collected dead reckoning data and reliability data can also be provided or made available to any other component or subsystem at the platform layer.

Similarly, the first data collector 311 and/or the second data collector 312 can be implemented as an integrated component of map subsystem 252 of the user interface server 250 at the framework layer of the cloud-based vehicle information and control ecosystem 201. The first data collector 311 and/or the second data collector 312 can also be implemented in the framework layer as a part of a mobile device application 106. The first data collector 311 and/or the second data collector 312 can be implemented in the framework layer to collect GPS data and/or dead reckoning data and related reliability data from an in-vehicle GPS receiver or in-vehicle dead reckoning subsystem. Data communications, as described above, can be used to transfer the data between the platform and framework layers. The collected GPS data and/or dead reckoning data and related reliability data can be provided or made available to any other component or subsystem at the framework layer. In this manner, the user interface server 250 and/or a mobile device app 106 in the framework layer can get access to GPS data and/or dead reckoning data and related reliability data generated by an in-vehicle GPS receiver, in-vehicle sensors, and/or dead reckoning data subsystems.

Moreover, the first data collector 311 and/or the second data collector 312 can also be implemented as an integrated component of map subsystem 212 of the vehicle information and control system 210 or an integrated component of map subsystem 222 of the user interface server 220 at the application layer of the cloud-based vehicle information and control ecosystem 201. The first data collector 311 and/or the second data collector 312 can also be implemented in the application layer as a part of a content source application 242. The first data collector 311 and/or the second data collector 312 can be implemented in the application layer to collect GPS data and/or dead reckoning data and related reliability data from an in-vehicle GPS receiver or in-vehicle dead reckoning subsystem. Data communications, as described above, can be used to transfer the data between the platform, framework, and application layers. The collected GPS data and/or dead reckoning data and related reliability data can be provided or made available to any other component or subsystem at the application layer. In this manner, the vehicle information and control system 210, the user interface server 220, and/or content sources 240 in the application layer can get access to GPS data and/or dead reckoning data and related reliability data generated by an in-vehicle GPS receiver, in-vehicle sensors, and/or dead reckoning data subsystems.

Thus, as described herein, the first data collector 311 and/or the second data collector 312 can be implemented at any layer of the cloud-based vehicle information and control ecosystem 201 to enable any component or subsystem at any layer to obtain access to GPS data and/or dead reckoning data and related reliability data generated or obtained from an in-vehicle GPS receiver and/or in-vehicle dead reckoning subsystem. As described above, data communications between layers of the cloud-based vehicle information and control ecosystem 201 can be used to convey the GPS data and/or dead reckoning data and related reliability data to other components, subsystems, and/or layers of ecosystem 201.

Similarly, a third data collector 313 can be implemented as an integrated component of map subsystem 252 of the user interface server 250 at the framework layer of the cloud-based vehicle information and control ecosystem 201. The third data collector 313 can also be implemented in the framework layer as a part of a mobile device application 106. The third data collector 313 can collect GPS data (or other geo-location information) and related reliability data from a GPS receiver (or other geo-location sensing device) resident in the mobile device 102. The GPS data and related reliability data obtained from the mobile device 102 is generated by a different GPS receiver (or other geo-location sensing device) as compared to the GPS data obtained from an in-vehicle GPS receiver via a corresponding ECU. As such, the geo-location data and related reliability data generated or obtained by the third data collector 313 originates from a different source (i.e., a mobile device 102) than the data generated by the first data collector 311 (i.e., an in-vehicle GPS receiver connected to an ECU). The GPS data and reliability data collected by the third data collector 313 can be provided or made available to any other component or subsystem at the framework layer.

The third data collector 313 can also be implemented as an integrated component of platform system 270 or as part of an in-vehicle platform application 105 to collect GPS data and related reliability data from a GPS receiver (or other goo-location sensing device) resident in the mobile device 102. Data communications, as described above, can be used to transfer the data between the platform and framework layers. The collected GPS data and related reliability data from the mobile device 102 can be provided or made available to any other component or subsystem at the framework or platform layers. In this manner, the platform system 270 in the platform layer can get access to GPS data and related reliability data generated by a mobile device 102 resident GPS receiver.

Moreover, the third data collector 313 can also be implemented as an integrated component of map subsystem 212 of the vehicle information and control system 210 or an integrated component of map subsystem 222 of the user interface server 220 at the application layer of the cloud-based vehicle information and control ecosystem 201. The third data collector 313 can also be implemented in the application layer as a part of a content source application 242. The third data collector 313 can be implemented in the application layer to collect GPS data and related reliability data from a mobile device 102 resident GPS receiver. Data communications, as described above, can be used to transfer the data between the platform, framework, and application layers. The collected GPS data and related reliability data can be provided or made available to any other component or subsystem at the application layer. In this manner, the vehicle information and control system 210, the user interface server 220, and/or content sources 240 in the application layer can get access to GPS data and related reliability data generated by a mobile device 102 resident GPS receiver.

Thus, as described herein, the third data collector 313 can be implemented at any layer of the cloud-based vehicle information and control ecosystem 201 to enable any component or subsystem at any layer to obtain access to GPS data and related reliability data generated or obtained from a mobile device 102 resident GPS receiver. As described above, data communications between layers of the cloud-based vehicle information and control ecosystem 201 can be used to convey the GPS data and related reliability data to other components or subsystems of ecosystem 201.

Referring still to FIGS. 2 and 3, a fourth data collector 314 can be implemented as integrated component of map subsystem 212 of the vehicle information and control system 210 or an integrated component of map subsystem 222 of the user interface server 220 at the application layer of the cloud-based vehicle information and control ecosystem 201. The fourth data collector 314 can also be implemented in the application layer as a part of a content source application 242. The fourth data collector 314 can be configured to generate or obtain geo-location data and/or geo-location reliability data from one or more content sources 240 or other network-based geo-location data sources. For example, network-based geo-location data can include map data, GPS receiver reliability data, satellite status information, GPS service data, weather information, or a variety of other information that may bear on the accuracy or predictability of the geo-location fixes generated by other components in the ecosystem 201. Additionally, network-based geo-location data sources can be deployed at various locations along roadways, on adjacent buildings, along railroad tracks, or other locations proximate to passing vehicles. In some cases, these network-based geo-location data sources can act as checkpoints to mark the passage or proximity of passing vehicles. Because the geo-location of the checkpoints can be precisely determined, the location of a particular vehicle can be precisely determined as the vehicle passes (or is proximate to) the checkpoint at a particular moment in time. The network-based geo-location data source can use network 205 to convey the vehicle location and timing (e.g., the vehicle geo-location based on a network-based geo-location data source) to other network-connected devices in the application layer. In this manner, the vehicle information and control system 210, the user interface server 220, and/or other content sources 240 can get access to GPS data and/or geo-location reliability data generated or obtained by a network-based geo-location data source via data communications within the application layer. Note that the vehicle geo-location fix based on a network-based geo-location data source may be different than either the geo-location of the vehicle based on an in-vehicle GPS receiver connected to an ECU or the geo-location of the vehicle based on a GPS receiver in a mobile device of an occupant of the vehicle.

The fourth data collector 314 can also be implemented as an integrated component of platform system 270 or as part of an in-vehicle platform application 105 to collect go-location data and/or geo-location reliability data from one or more content sources 240 and/or other network-based geo-location data sources. Data communications, as described above, can be used to transfer the data between the platform, framework, and application layers. The collected GPS data and related reliability data from the network-based geo-location data sources can be provided or made available to any other component or subsystem at the application or platform layers. In this manner, the platform system 270 in the platform layer can get access to GPS data and related reliability data generated by network-based geo-location data sources.

Similarly, the fourth data collector 314 can be implemented as an integrated component of map subsystem 252 of the user interface server 250 at the framework layer of the cloud-based vehicle information and control ecosystem 201. The fourth data collector 314 can also be implemented in the framework layer as a part of a mobile device application 106. The fourth data collector 314 can be implemented in the framework layer to collect geo-location data and/or geo-location reliability data from one or more content sources 240 and/or other network-based geo-location data sources. Data communications, as described above, can be used to transfer the data between the application and framework layers. The collected geo-location data and/or geo-location reliability data can be provided or made available to any other component or subsystem at the framework layer. In this manner, the user interface server 250 and/or a mobile device app 106 in the framework layer can get access to GPS data and related reliability data generated by network-based geo-location data sources.

Finally, a fifth data collector 315 can be provided in a particular embodiment. Again, the fifth data collector 315 can be implemented in components of the platform, framework, or application layers as described above. The fifth data collector 315 can be implemented in any of the ecosystem 201 layers to collect explicitly provided geo-location information from a user. For example, a user operating a vehicle in which a platform system 270 includes a fifth data collector 315 can use provided user interfaces to explicitly specify a geo-location of the vehicle at a particular moment. Similarly, a user operating a vehicle in which an occupant has a mobile device 102 with a mobile app 106 that includes a fifth data collector 315 can use mobile app 106 provided user interfaces to explicitly specify a geo-location of the vehicle at a particular moment. A user in data connection with a content source 240 and/or other network-based geo-location data source that includes a fifth data collector 315 can use provided user interfaces to explicitly specify a geo-location of a vehicle at a particular moment. The fifth data collector 315 can be useful for explicitly calibrating or initializing a particular GPS device, geo-location sensing device, or network-based geo-location data source. Thus, as described above, various types of geo-location data collectors 310 can be implemented at any layer of the cloud-based vehicle information and control ecosystem 201. Data communications between layers of the ecosystem 201 can be used to convey the GPS data (or other geo-location information) and related reliability data to other components or subsystems of ecosystem 201. The GIPS data (or other geo-location information) and related reliability data can thereby be conveyed as input to the geo-location aggregation engine 350 shown in FIG. 3.

It will be apparent to those of ordinary skill in the art that a variety of other geo-location data collectors 310 can be used to gather geo-location data in a variety of ways. For example, cell tower triangulation of signals from a mobile device 102 can be used to determine a geo-location of the mobile device 102. If the mobile device 102 is with an occupant of a vehicle 104, the geo-location of the mobile device 102 can also define the geo-location of the vehicle 104. Cell tower triangulation of signals from a mobile device 102 can be performed or assisted by network resources that are accessible through the layers of the cloud-based vehicle information and control ecosystem 201 as described herein. Additionally, the other gee-location data collectors 310 can include a WiFi WAP proximity detector for using WiFi signals from a mobile device 102 to determine a geo-location of the mobile device 102 as described above. Again, the geo-location determination of the mobile device 102 based on WiFi proximity can be performed or assisted by network resources that are accessible through the layers of the cloud-based vehicle information and control ecosystem 201 as described herein. As described above, techniques for determining the location of a mobile device based on a mobile device resident GPS receiver, cell tower triangulation, or WiFi WAP proximity are well-known to those of ordinary skill in the art. Any of these techniques for determining a geo-location fix can be used and provided as a geo-location data collector 310.

Referring again to FIG. 3, the geo-location aggregation engine 350 can receive geo-location data and related reliability data from a variety of geo-location data collectors 310 and, along with the map data set 320 and configuration data set 340, produce a resulting geo-location fix based on aggregated geo-location data from a plurality of sources. For example, the geo-location aggregation engine 350 can receive a GPS geo-location fix for a particular vehicle at a particular moment in time from an in-vehicle GPS receiver connected to an ECU via a first data collector 311. Similarly, the geo-location aggregation engine 350 can also receive dead reckoning data for the particular vehicle at the particular moment in time from a dead reckoning subsystem of the vehicle via a second data collector 312. The geo-location aggregation engine 350 can also receive a GPS geo-location fix for the particular vehicle at the particular moment in time from GPS receiver in a mobile device of an occupant of the vehicle via a third data collector 313. The geo-location aggregation engine 350 can also receive a geo-location fix for the particular vehicle based on cell tower triangulation or WiFi WAP proximity detection as described above. The geo-location aggregation engine 350 can also receive a CPS geo-location fix for the particular vehicle at the particular moment in time from a network-based geo-location data source via a fourth data collector 314. Finally, the geo-location aggregation engine 350 can receive a GPS geo-location fix for the particular vehicle at the particular moment in time from an explicit user data entry via a fifth data collector 315. As described in more detail below, the geo-location aggregation engine 350 can select the best geo-location fix or combine a plurality of geo-location fixes to produce a resulting geo-location fix. This geo-location fix can be rendered more accurately based on input from multiple sources and the connected intelligence of multiple resources at each of the layers of the cloud-based vehicle information and control ecosystem 201.

As shown in FIG. 3, the geo-location aggregation engine 350 can receive input from a map data set 320, a data collector reliability data set 330, and a configuration data set 340. The map data set 320 includes conventional map data, such as a scaled two-dimensional or three-dimensional arrangement of natural and man-made landmarks in a particular geographical location. Typically, the specific geo-location of landmarks and other objects on the map can be determined from the map data set 320. Additionally, the map data can be augmented to include information related to regions or geographical locations where GPS service may be intermittent or unavailable. For example, locations of tunnels, deep canyons, mountains, tall buildings, etc. where GPS signals may be blocked can be identified in regional interference information of the map data set 320. The data collector reliability data set 330 can include the reliability data obtained from each of the geo-location data sources as described above. This reliability data can be used to ascertain the reliability of geo-location data provided by a particular geo-location data source. The data collector reliability data set 330 can also include historical data that specifies the geo-location data and reliability data provided by a particular geo-location data source for a past period of time. The historical data can be used to identify trends over time in the data produced by a particular geo-location data source. The data collector reliability data set 330 can also include device data and service data that specify any interruptions or degradations that may be occurring with respect to particular geo-location data sources or system-wide geo-location service providers. The data collector reliability data set 330 can also include a set of weighted values that define a confidence level that a geo-location service provider can apply to particular geo-location data sources or system-wide geo-location service providers. The weighted values can be used to bias the geo-location aggregation engine 350 for or against particular geo-location data sources. Finally, the configuration data set 340 can be used to define configuration values to specify the manner in which a system operator wants the geo-location aggregation engine 350 to operate. For example, the configuration data set 340 can be used to configure the weighted values or to specify the type of geo-location action processor 360 the geo-location aggregation engine 350 should use for processing the geo-location collected by the geo-location data collectors 310.

As described above, the geo-location aggregation engine 350 can receive geo-location data and related reliability data from a variety of geo-location data collectors 310. As described, the geo-location aggregation engine 350 can receive: 1) a GPS geo-location fix for a particular vehicle at a particular moment in time from an in-vehicle GPS receiver connected to an ECU; 2) dead reckoning data for the particular vehicle at the particular moment in time from a dead reckoning subsystem of the vehicle: 3) a GPS geo-location fix for the particular vehicle at the particular moment in time from GPS receiver in a mobile device of an occupant of the vehicle; 4) a GPS geo-location fix for the particular vehicle at the particular moment in time from a network-based geo-location data source; and 5) a GPS geo-location fix for the particular vehicle at the particular moment in time from an explicit user data entry. Given this geo-location data and related reliability data, the geo-location aggregation engine 350 can perform a variety of configurable processing operations and related actions. For example, the geo-location aggregation engine 350 can use a first action processor 361 to identify a best geo-location fix from the geo-location data received from the geo-location data collectors 310. The best geo-location fix can be a geo-location fix from one of the geo-location data collectors 310 that may have the highest related reliability data from the data collector reliability data set 330 or that may have a high level of accuracy based on map data set 320. For example, the best geo-location fix can represent a geo-location fix from a geo-location data source that has reported no errors (or few errors), has a historical data trend that is not erratic or intermittent, is a type of geo-location data source known to be reliable, and has been weighted by a system operator in a manner indicating a high level of confidence in the geo-location data source. Additionally, the first action processor 361 can refer to the map data set 320 to determine if the geo-location fix being processed represents a location within a regional interference area. If so, the geo-location fix may be less accurate or less reliable as GPS receivers in the regional interference area may report errant or erratic geo-location data. In this case, the first action processor 361 can prioritize or re-prioritize the geo-location data collectors 310 to favor geo-location data collectors 310 that may be more accurate in the regional interference area and discount the data received from the goo-location data collectors 310 that may be sensitive to regional interference. As a result, the first action processor 361 can use map data to customize or modify the manner in which the best geo-location fix is calculated based on geographical features on the map. Similarly, the first action processor 361 can prioritize or re-prioritize the geo-location data collectors 310 to favor geo-location data collectors 310 that may be more accurate within particular timeframes. For example, some geo-location data collectors 310 may be more accurate at night or on weekends when there is less ambient interference. As a result, the first action processor 361 can use time and date data to customize or modify the manner in which the best geo-location fix is calculated based on temporal factors. Thus, using a variety of factors as described above, the first action processor 361 can identify and select a best geo-location fix from a plurality of geo-location fixes received from the geo-location data collectors 310. The best geo-location fix represents a resulting geo-location fix produced by the geo-location aggregation engine 350.

The first action processor 361, and each of geo-location action processors 360, can be implemented as a software or firmware module with processing logic embedded therein for performing processing operations on the GPS and timing data (or other geo-location data or reliability data) received from one or more GPS receivers or geo-location data sources.

Alternatively or in combination, the geo-location aggregation engine 350 can use a second action processor 362 to determine an average or composite geo-location fix from the geo-location data received from the geo-location data collectors 310. The composite geo-location fix can be a combined geo-location fix from a plurality of the geo-location fixes provided by a plurality of the geo-location data collectors 310. Instead of selecting a single best geo-location fix as the first action processor 361 does, the second action processor 362 produces a combination of the plurality of the geo-location fixes. For example, the second action processor 362 can compute an average or an interpolation of the input plurality of the geo-location fixes. In one embodiment, the best two or more geo-location fixes can be selected based on the reliability data as described above. Then, the selected best geo-location fixes can be interpolated to produce a composite geo-location fix. In another embodiment, the weighted values corresponding to each geo-location data source can be used in the interpolation to shift the composite geo-location fix toward the geo-location fixes with the highest weighted values, wherein the highest weighted values correspond to a higher level of confidence in the geo-location produced by a particular geo-location data source. As described above, the second action processor 362 can use map data to customize or modify the manner in which the composite geo-location fix is calculated based on geographical features on the map. Moreover, the second action processor 362 can use time and date data to customize or modify the manner in which the composite geo-location fix is calculated based on temporal factors. In this manner, the second action processor 362 can compute a composite geo-location fix from a plurality of geo-location fixes. The composite geo-location fix represents a resulting geo-location fix produced by the geo-location aggregation engine 350. It will be apparent to those of ordinary skill in the art upon reading this disclosure that a variety of techniques can be used to compute a combined, averaged, or composite geo-location fix from a plurality of geo-location fixes.

Alternatively or in combination, the geo-location aggregation engine 350 can also use a third action processor 363 to report errors that may have been received in the goo-location data received from the geo-location data collectors 310. For example, a geo-location fix received from a particular geo-location source may be significantly different (e.g., outside a configurable range) than the geo-location fix received from other geo-location sources. These geo-location differentials can be tracked over time using the historical data in reliability data set 330. The third action processor 363, operating under a configurable rule set, can determine that the particular geo-location source is producing errant or erratic geo-location data given the significantly different geo-location fix or a history of errant geo-location fixes provided by the particular geo-location source. In this case, the third action processor 363 can report the error to other processing components, subsystems, or layers of the ecosystem 201. Additionally, the third action processor 363 can adjust the reliability data in the data collector reliability data set 330 to reflect the errant geo-location fixes provided by the particular geo-location source.

Alternatively or in combination, the geo-location aggregation engine 350 can also use a fourth action processor 364 to perform a re-calibration operation on a particular geo-location data source. As described above, the fourth action processor 364 can identify a particular goo-location source that is producing errant geo-location fixes. The fourth action processor 364 can also identify a particular geo-location source that is not producing data at all. In these cases, the fourth action processor 364 can cause data transmissions through ecosystem 201 to re-calibrate, re-configure, or reset the particular geo-location source. For example, techniques are well-known for re-calibrating a GPS receiver. Similar operations can be performed on other types of geo-location sources to induce the devices to start or continue producing accurate geo-location fixes.

As with the geo-location data collectors 310 described above, the geo-location aggregation engine 350 can be implemented at any layer of the cloud-based vehicle information and control ecosystem 201. For example, the geo-location aggregation engine 350 can be implemented as an integrated component of platform system 270 or as part of an in-vehicle platform application 105 to aggregate geo-location data received from a plurality of geo-location data collectors 310. Similarly, the geo-location aggregation engine 350 can be implemented as an integrated component of map subsystem 252 of the user interface server 250 or as a part of a mobile device application 106 at the framework layer of the cloud-based vehicle information and control ecosystem 201. Moreover, the geo-location aggregation engine 350 can be implemented as an integrated component of map subsystem 212 of the vehicle information and control system 210 or an integrated component of map subsystem 222 of the user interface server 220 at the application layer of the cloud-based vehicle information and control ecosystem 201. The geo-location aggregation engine 350 can also be implemented in the application layer as a part of a content source application 242. Because the geo-location data collectors 310 described above can be implemented at any layer of the ecosystem 201, the geo-location aggregation engine 350 can be implemented at any layer of the ecosystem 201 and can have access to the geo-location data provided by the geo-location data collectors 310 at any layer. Thus, a system and method for obtaining geographical location data from multiple sources and aggregating the geographical location data is disclosed.

FIG. 4 is a processing flow diagram illustrating an example embodiment of systems and methods for obtaining geographical location data from multiple sources and aggregating the geographical location data as described herein. The method 400 of an example embodiment includes: receiving geo-location data from a plurality of geo-location data collectors, at least one of the plurality of geo-location data collectors being in data communication with an in-vehicle geo-location data source, at least one of the plurality of geo-location data collectors being in data communication with a geo-location data source in a mobile device (processing block 410); collecting reliability data corresponding to one or more of a plurality of geo-location data sources corresponding to the plurality of geo-location data collectors (processing block 420); collecting map data including information related to geographical features associated with the geo-location data (processing block 430); and aggregating, by use of a data processor, the geo-location data from the plurality of geo-location data collectors based on the reliability data and the map data to produce a resulting geo-location fix (processing block 440).

Figure 5:
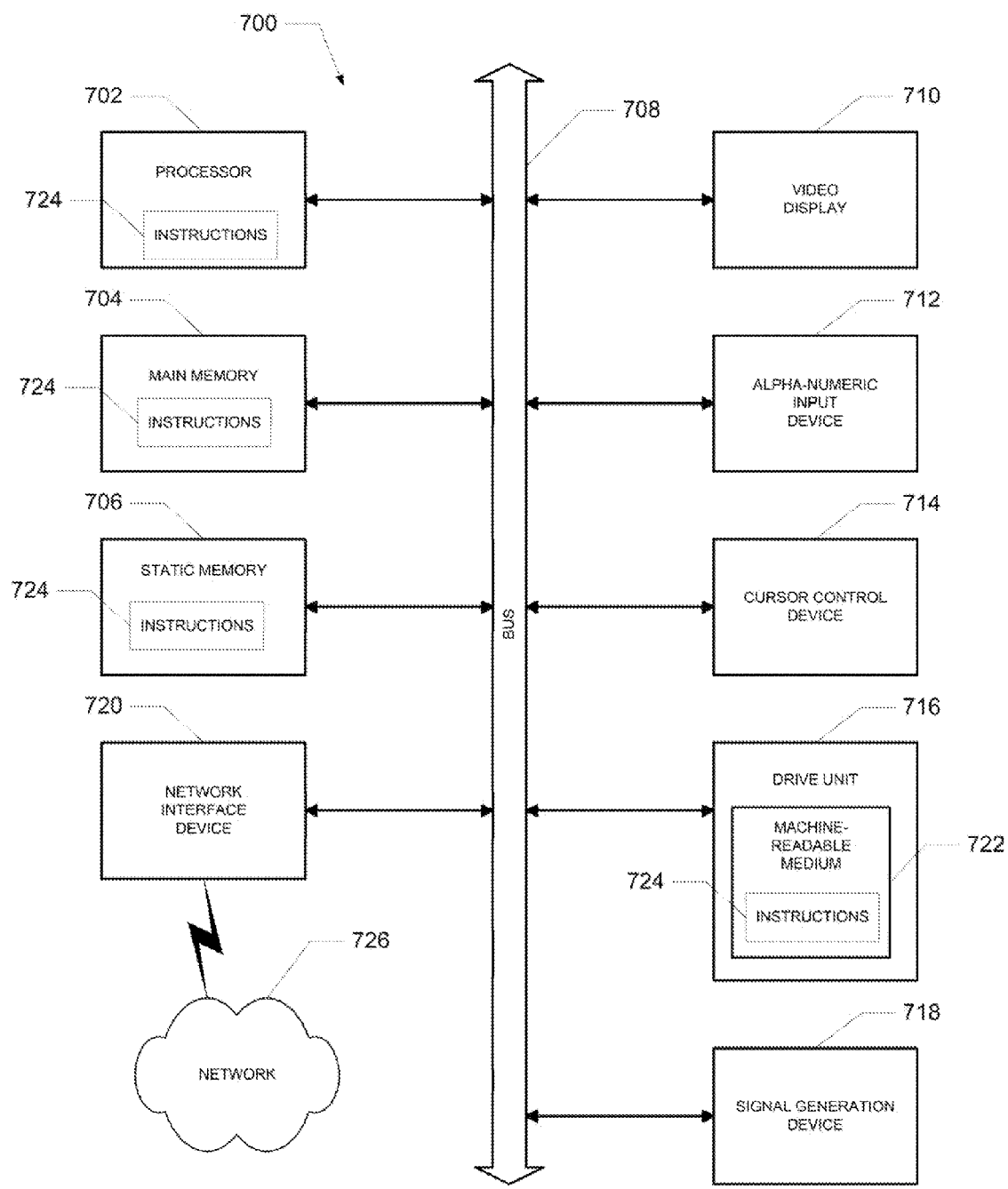
FIG. 5 shows a diagrammatic representation of machine in the example form of a computer system within which a set of instructions when executed may cause the machine to perform any one or more of the methodologies discussed herein.

FIG. 5 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g. a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving geo-location data from a plurality of geo-location data collectors, at least one of the plurality of geo-location data collectors being in data communication with an in-vehicle geo-location data source, at least one of the plurality of geo-location data collectors being in data communication with a geo-location data source in a mobile device;
    collecting reliability data corresponding to one or more of a plurality of geo-location data sources corresponding to the plurality of geo-location data collectors;
    collecting map data including information related to geographical features associated with the geo-location data;
    identifying, by use of a data processor and a first action processor, the geo-location data from a particular one of the plurality of geo-location data collectors based on the reliability data and the map data to produce a single resulting best fit geo-location fix;
    aggregating, by use of the data processor and a second action processor, the geo-location data from the plurality of geo-location data collectors based on the reliability data and the map data to produce a single resulting composite geo-location fix, the aggregating including combining the geo-location data from a plurality of geo-location data collectors to produce the single resulting composite geo-location fix representing an aggregate geo-location fix derived from multiple geo-location data collectors; and using pre-configured data to select either the resulting best fit geo-location fix or the resulting composite geo-location fix.

2. The method as claimed in claim 1 wherein the in-vehicle geo-location data source is in data communication with an electronic control unit (ECU) of a vehicle.

3. The method as claimed in claim 1 wherein the in-vehicle geo-location data source is a dead reckoning subsystem.

4. The method as claimed in claim 1 wherein the in-vehicle geo-location data source is a global positioning device (GPS).

5. The method as claimed in claim 1 wherein the geo-location data source in the mobile device is a global positioning device (GPS).

6. The method as claimed in claim 1 wherein the geo-location data collector in data communication with the geo-location data source in the mobile device is implemented in a mobile device application.

7. The method as claimed in claim 1 wherein at least one of the plurality of geo-location data collectors being in data communication with a network-based geo-location data source, the network-based geo-location data source being in data communication with the Internet.

8. A system comprising:
one or more data processors; and
a cloud-based vehicle information and control ecosystem, executable by the one or more data processors, to:
receive geo-location data from a plurality of geo-location data collectors, at least one of the plurality of geo-location data collectors being in data communication with an in-vehicle geo-location data source, at least one of the plurality of geo-location data collectors being in data communication with a geo-location data source in a mobile device;
collect reliability data corresponding to one or more of a plurality of geo-location data sources corresponding to the plurality of geo-location data collectors;
collect map data including information related to geographical features associated with the geo-location data;
identify the geo-location data from a particular one of the plurality of geo-location data collectors based on the reliability data and the map data to produce a single resulting best fit geo-location fix;
aggregate the geo-location data from the plurality of geo-location data collectors based on the reliability data and the map data to produce a single resulting composite geo-location fix, the aggregating including combining the geo-location data from a plurality of geo-location data collectors to produce the single resulting composite geo-location fix representing an aggregate geo-location fix derived from multiple geo-location data collectors; and
use pre-configured data to select either the resulting best fit geo-location fix or the resulting composite geo-location fix.

9. The system as claimed in claim 8 wherein the in-vehicle geo-location data source is in data communication with an electronic control unit (ECU) of a vehicle.

10. The system as claimed in claim 8 wherein the in-vehicle geo-location data source is a dead reckoning subsystem.

11. The system as claimed in claim 8 wherein the in-vehicle geo-location data source is a global positioning device (GPS).

12. The system as claimed in claim 8 wherein the geo-location data source in the mobile device is a global positioning device (GPS).

13. The system as claimed in claim 8 wherein the geo-location data collector in data communication with the geo-location data source in the mobile device is implemented in a mobile device application.

14. The system as claimed in claim 8 wherein at least one of the plurality of geo-location data collectors being in data communication with a network-based geo-location data source, the network-based geo-location data source being in data communication with the Internet.

15. A non-transitory machine-useable storage medium embodying instructions which, when executed by a machine, cause the machine to:
receive geo-location data from a plurality of geo-location data collectors, at least one of the plurality of geo-location data collectors being in data communication with an in-vehicle geo-location data source, at least one of the plurality of geo-location data collectors being in data communication with a geo-location data source in a mobile device;
collect reliability data corresponding to one or more of a plurality of geo-location data sources corresponding to the plurality of geo-location data collectors;
collect map data including information related to geographical features associated with the geo-location data;
identify the geo-location data from a particular one of the plurality of geo-location data collectors based on the reliability data and the map data to produce a single resulting best fit geo-location fix;
aggregate the geo-location data from the plurality of geo-location data collectors based on the reliability data and the map data to produce a single resulting composite geo-location fix, the aggregating including combining the geo-location data from a plurality of geo-location data collectors to produce the single resulting composite geo-location fix representing an aggregate geo-location fix derived from multiple geo-location data collectors; and
use pre-configured data to select either the resulting best fit geo-location fix or the resulting composite geo-location fix.

16. The machine-useable storage medium as claimed in claim 15 wherein the in-vehicle geo-location data source is in data communication with an electronic control unit (ECU) of a vehicle.

* * * * *